(12) United States Patent
Ainslie et al.

(10) Patent No.: US 9,562,569 B2
(45) Date of Patent: Feb. 7, 2017

(54) METHOD OF FLANGE ALIGNMENT

(75) Inventors: Walter Ernest Ainslie, Ramona, CA (US); David Ronald Adair, Escondido, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1137 days.

(21) Appl. No.: 13/450,612

(22) Filed: Apr. 19, 2012

(65) Prior Publication Data

US 2013/0276454 A1 Oct. 24, 2013

(51) Int. Cl.
*F16D 1/02* (2006.01)
*F16D 1/033* (2006.01)
*F16D 1/076* (2006.01)

(52) U.S. Cl.
CPC .............. *F16D 1/033* (2013.01); *F16D 1/076* (2013.01); *Y10T 29/49947* (2015.01); *Y10T 403/64* (2015.01)

(58) Field of Classification Search
CPC ...... F16D 2001/102; F16D 1/10; F16D 1/101; Y10T 403/7045; Y10T 403/64; F16L 19/02; F16L 19/025; F16L 23/00; F16L 23/04; F16L 23/06; F16L 23/08; F16L 23/10; F16L 47/14; F16L 49/04; F16B 7/0426; F16B 7/0406; F16B 7/04
See application file for complete search history.

(56) References Cited

U.S. PATENT DOCUMENTS 1,880,983 A * 10/1932 Reis ......................... F01L 13/08
123/149 R
2,303,031 A * 11/1942 Dusevoir ................ F16D 1/033
248/230.5

\* cited by examiner

*Primary Examiner* — Matthieu Setliff
(74) *Attorney, Agent, or Firm* — Kinney & Lange, P.A.

(57) ABSTRACT

A method of aligning flanges on two components to align and transfer torque from one component to the other uses a plurality of scallop regions on the periphery of a flange on one component; and a plurality of raised regions on the periphery of a flange on the other component, the raised regions being sized and shaped to engage the scallop regions on the flange when axially aligned to transfer torque there between.

15 Claims, 3 Drawing Sheets

METHOD OF FLANGE ALIGNMENT

STATEMENT OF GOVERNMENT INTEREST

This invention was made with government support under Contract No. N00019-06-C-0081 awarded by the US Navy. The government has certain rights in the invention.

BACKGROUND

When two v-band flanges are assembled together, such as the flange of a starter assembled to a gearbox, their relative clocking position is typically controlled using a pin in one flange and a hole in the other flange. The addition of a pin to one flange is performed by drilling a hole normal to the face of the flange and installing a pin. This pin is pressed into the flange and is retained by an interference fit with the flange. This interference fit results in tensile stresses in the flange which can reduce the life of the flange in high vibratory environments.

For example, flange-to-flange mating of starters to gearboxes of gas turbine engines is important because the starter imparts a high degree of vibration and torque, especially when the starter is hydraulic. Efforts to use pins and holes have not been found to survive high torque and vibration during use, such as with starter motors and gearboxes. The flanges mate, but because of stresses in the flanges and/or because of the pin or the hole, flanges may not survive adequately for operational use.

SUMMARY

The present invention is capable of mating the flanges of two components such as starter motors to gearboxes and function under high vibration and torque without failure, thus making the use of high performance starter motors commercially viable. The flanges are clocked relative to each other by forming a plurality of scallop shaped cut outs on the periphery of one flange and a matching plurality of raised regions or bosses on the periphery of the other flange. The cut out area and the raised regions mate to provide alignment of the flanges and to transfer torque without adversely affecting either flange.

The specific shape of the scalloped or cut out regions on the flange depends upon the amount of flange metal available and the size and shape of the bosses or raised regions. If the cut out regions are first configured, then the raised regions are designed to engage them. Conversely, if the raised regions are formed first, the cut out regions will be designed to engage them. Both the scallops and the raised regions may be formed by any normal method. Machining them has been effective.

DETAILED DESCRIPTION

Figure 1:
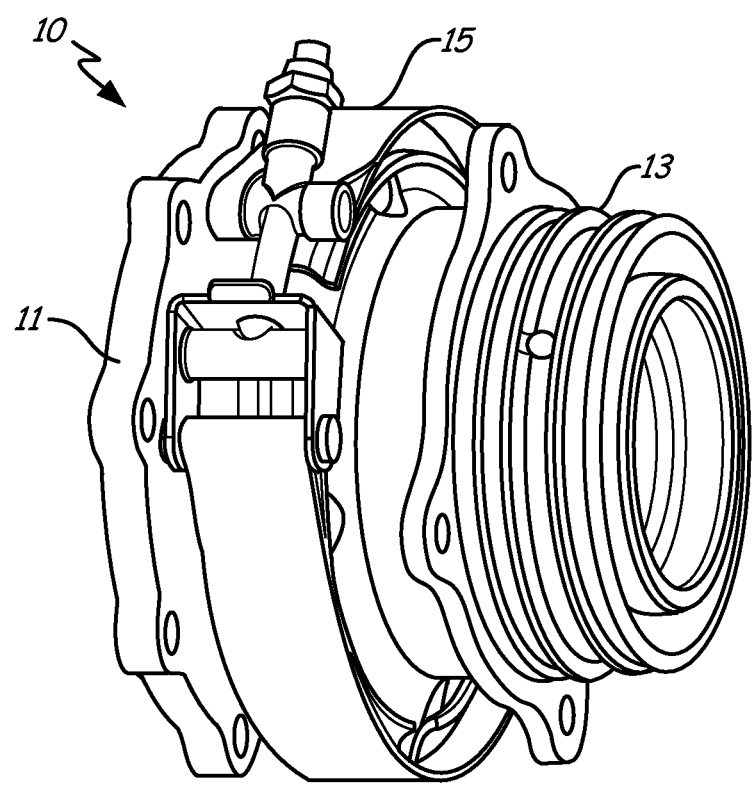
FIG. 1 is a perspective view of a starter motor flange assembled on a gearbox flange according to the present invention.

FIG. 1 illustrates a typical gas turbine engine component mounting or bonding of two parts of the engine using flanges to align and transfer torque between the parts. The engine component 10, generally, includes a starter motor 11 (shown only as the mount) mated with a gearbox 13, shown only in part. Clamp 15 surrounds the periphery of the junction of the starter motor 11 and gearbox 13.

Figure 2A:
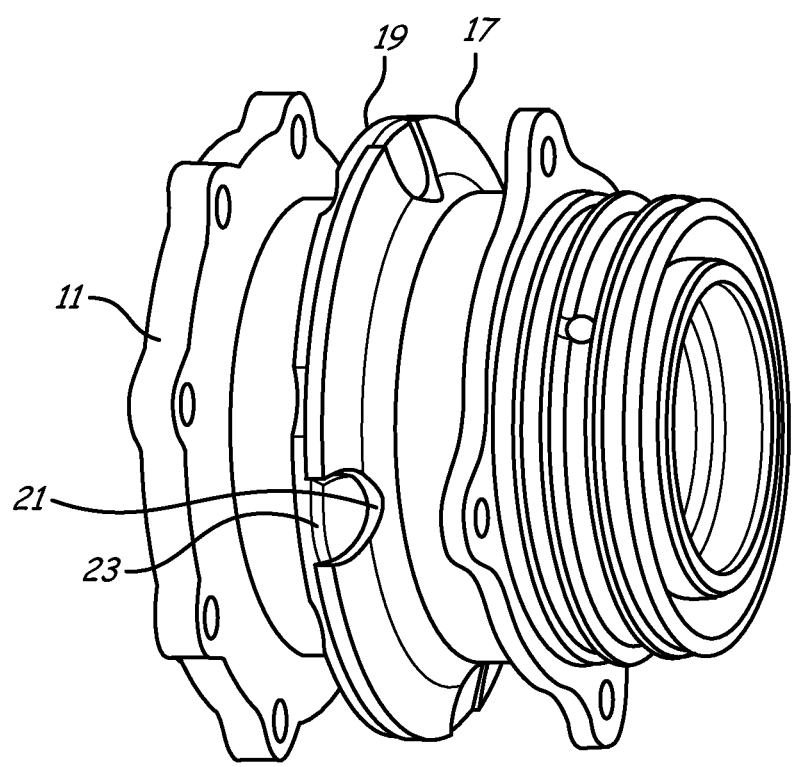
FIG. 2A is a perspective view of the assembly of FIG. 1, with the clamp removed to show the engagement of a scallop cut out on one flange and a raised region on the other flange.

Gearbox 13 has flange 17 that is to engage a similar flange 19 on starter motor 11, shown more clearly in FIG. 2A with clamp 15 removed. Gearbox flange 17 has a plurality of scallop areas 21. In one embodiment, the scallop areas 21 extend from an edge to an interior of the flange and are spaced apart by 90° around a periphery of the flange 17. Starter motor 11 has a plurality of raised regions 23 around a periphery of the flange 19 that are formed to fit in scallop areas 21, again spaced apart by 90°. As is clear in FIG. 2, the scallop areas 21 and raised regions 23 mate in such a manner that when flanges 17 and 19 are axially aligned (i.e., the raised regions 23 are in an interference fit with the scallop areas 21), they transfer torque from starter motor 11 to gearbox 13 during operation of the components.

Both flanges 17 and 19 are structurally sound because there is no internal stress caused by holes drilled or pins driven into them. The present invention accomplishes the junction of the gas turbine engine components using the least amount of metal, thus keeping the weight as low as possible. Alternative proposed efforts such as using larger diameters with pins and holes or making the flanges thicker are less effective, due to weight concerns as well as less effective alignment of the gas turbine engine components.

The term "scallop region" is defined as an area on the flange that has been removed, such as by machining, and is not limited to any specific shape. The shape can be round, as shown in the drawings, but it can also be "V" shaped, triangular, rectangular or square. All that is required to be a scallop region is that a portion of the flange has been removed to provide a surface into which a portion of the other mating flange can fit.

The term raised region or "boss" is defined as a region on one flange that protrudes or extends out in alignment with a scallop region of the other flange. Raised regions can be formed by machining the rest of the flange face, or by other methods such as casting or extruding a region to fulfill that function.

Figure 2B:
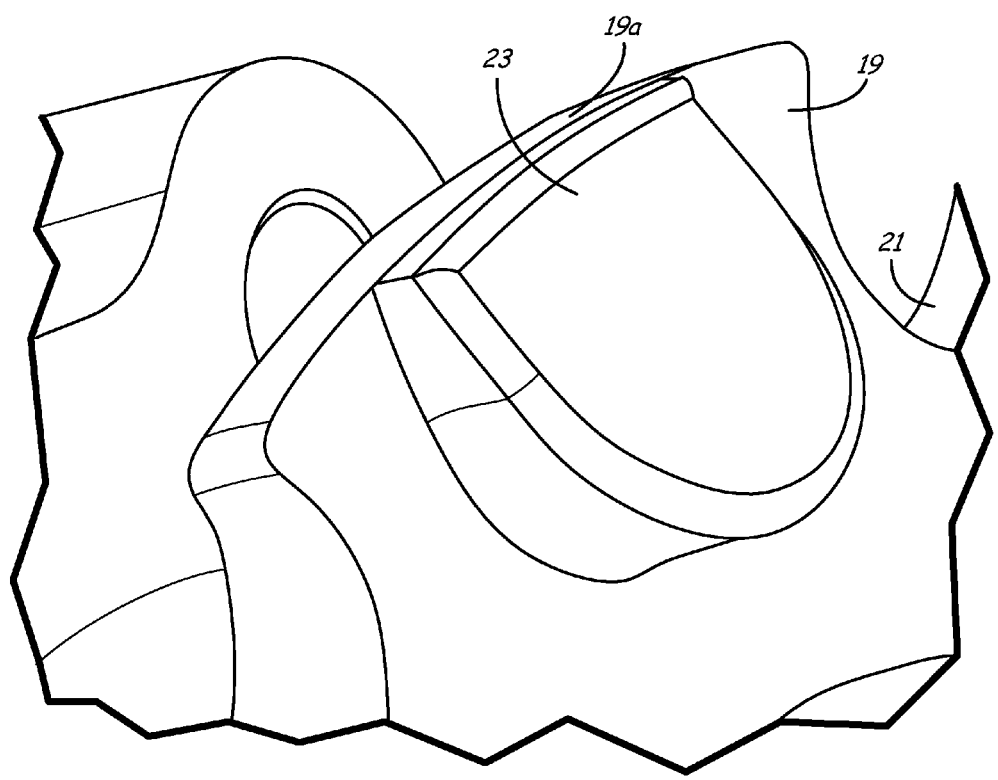
FIG. 2B is an exploded view of the raised region on the starter motor flange of FIGS. 1 and 2A.

In FIG. 2B, raised region 23, is shown as being thicker at the radially inward ends (i.e., raised region 23 is generally "heel shaped") and scallop 21 is similarly thicker radially inward. In this embodiment, the mating of the scallop 21 and raised region 23 is made stronger, allowing even more torque to be transmitted effectively. Also shown in FIG. 2B is flange 19 with both scallops 21 and raised regions 23. Having both scallops 21 and raised regions on flange 19 and on flange 17 provides double mating and torque transmitting capability. The raised region 23 is on a radially extending tooth 19a of flange 19. Also shown in FIG. 2B are scallop region 21 and boss or raised region 23 being rounded at the inward edge and extend out to the outer or circumferential end of flange 19. The side surfaces of raised region 23 contact the side surfaces of scallop region 23.

The size and shape of scallops 21 and raised regions 23 is determined by the amount of torque the two parts will experience in use, as well as by the amount of material that flanges 17 and 19 have. The mating flanges should have as little weight as possible while being strong enough to transfer the torque as described above.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of aligning flanges on two components to align and transfer torque from one component to the other, the method comprising:

positioning a first flange in axial alignment with a second flange so that a first contact face of the first flange contacts a second contact face of the second flange, and so that each of a plurality of raised regions extending from the first contact face in a first axial direction extend into and mate with one of a plurality of scallop regions in the second flange, each of the plurality of raised regions extending a first distance in the first axial direction near a radially outer end of the plurality of raised regions that is less than a second distance that the plurality of raised regions extend in the first axial direction near a radially inner end of the plurality of raised regions; and clamping together the first and second flanges.

2. The method of claim 1, wherein the plurality of raised regions are formed by machining a surface of the flange, leaving only the raised regions.

3. The method of claim 1, wherein the plurality of scallop regions and the plurality of raised regions have surfaces that mate in contact with each other.

4. The method of claim 1, wherein the two components are components of a gas turbine engine.

5. The method of claim 4, wherein the two components are a starter motor and a gearbox.

6. An assembly comprising:

a first component having a flange with a plurality of scallop regions that extend from an edge on a periphery of the flange to an interior of the flange, the flange and the plurality of scallop regions being thicker in a radially inward direction; and a second component having a flange with a plurality of raised regions that extend away from the flange at a periphery of the flange in a first axial direction, the plurality of raised regions extending a first distance in the first axial direction near the periphery of the flange that is less than a second distance that the plurality of raised regions extend in the first axial direction near a radially inner end of the plurality of raised regions, each of the plurality of raised regions being sized and shaped to engage and mate with the plurality of scallop regions on the first component flange when the first and second components are axially aligned to transfer torque there between.

7. The assembly of claim 6, wherein the plurality of raised regions are formed by machining a surface of the second component flange leaving only the raised regions.

8. The assembly of claim 6, wherein the plurality of scallop regions and the plurality of raised regions have curved surfaces that mate in contact with each other.

9. The assembly of claim 6, wherein the first and second components are components of a gas turbine engine.

10. The assembly of claim 9, wherein the first and second components are a starter motor and a gearbox.

11. A gas turbine engine having a first component and a second component that mate to align and transfer torque from one component to the other, the gas turbine engine comprising:

the first component having a flange with a first plurality of scallop regions and a first plurality of raised regions with the first plurality of raised regions extending away from the flange at a periphery of the flange in a first axial direction, the first plurality of raised regions at the edge on the periphery of the flange extending a first distance in the first axial direction that is less than a second distance in the first axial direction at the interior of the flange; and the second component having a flange with a second plurality of scallop regions and a second plurality of raised regions with the second plurality of raised regions extending away from the flange at a periphery of the flange in a second axial direction, the second plurality of raised regions at the edge on the periphery of the flange extending a third distance in the second axial direction that is less than a fourth distance in the first axial direction at the interior of the flange, wherein the first plurality of raised regions of the first component are sized and shaped to engage and mate with the second plurality of scallop regions of the second component and the second plurality of raised regions of the second component are sized and shaped to engage and mate with the first plurality of scallop regions of the first component when the first and second components are axially aligned to transfer torque there between.

12. The gas turbine engine of claim 11, wherein the second plurality of raised regions are formed by machining a surface of the second component flange leaving only the plurality of second raised regions.

13. The gas turbine engine of claim 11, wherein the first plurality of scallop regions and the second plurality of raised regions have curved surfaces that mate in contact with each other.

14. The gas turbine engine of claim 11, wherein the first and second components are components of a gas turbine engine.

15. The gas turbine engine of claim 14, wherein the first and second components are a starter motor and a gearbox.

* * * * *